United States Patent
Depenheuer

[15] 3,649,083
[45] Mar. 14, 1972

[54] ANTISKID DEVICE

[72] Inventor: Otto Depenheuer, Bad Homburg, Germany

[73] Assignees: International Telephone and Telegraph Corporation, New York, N.Y.

[22] Filed: Apr. 23, 1970

[21] Appl. No.: 31,163

[30] Foreign Application Priority Data

May 13, 1969 Germany ..................... P 19 24 346.0
July 12, 1969 Germany ..................... P 19 35 590.9

[52] U.S. Cl. ........................... 303/21 B, 73/511, 188/181 C, 303/20, 317/5, 324/161
[51] Int. Cl. ........................................... B60t 8/08, B60t 8/10
[58] Field of Search ................. 73/488, 511, 517 R; 188/181; 303/20, 21; 317/5; 318/52; 324/161; 340/263

[56] References Cited

UNITED STATES PATENTS

| | | | |
|---|---|---|---|
| 3,359,042 | 12/1967 | Dave | 303/21 BB |
| 3,365,244 | 1/1968 | Mueller | 303/21 BB |
| 3,432,212 | 3/1969 | Stevens | 188/181 A X |
| 3,526,439 | 9/1970 | Stevens | 188/181 A X |
| 3,276,822 | 10/1966 | Lister et al. | 303/21 F |

*Primary Examiner*—Milton Buchler
*Assistant Examiner*—Stephen G. Kunin
*Attorney*—C. Cornell Remsen, Jr., Walter J. Baum and Paul W. Hemminger

[57] ABSTRACT

An antiskid brake system in which the difference between vehicle speed and the wheel speed is measured and optimum slippage maintained. The vehicle speed signal is generated by a flywheel which initially rotates at a speed corresponding to the wheel speed and is braked by an inert friction block mass which is forced against the fly wheel by the action of a pendulum as a function of actual vehicle deceleration.

14 Claims, 3 Drawing Figures

Patented March 14, 1972

Inventor
Otto Depenheuer
By Bernard L. Pacquale
Attorney

ANTISKID DEVICE

BACKGROUND OF THE INVENTION

This invention relates to an antiskid device, particularly for automotive vehicles, in which the output signals of speed sensors associated with the individual wheels of the vehicle are compared with a reference signal in order to influence the brake pressure in dependence on a signal resulting from the comparison.

The friction value versus slip diagram (FIG. 1) shows that the maximum friction value $\mu$ between the road and the contact surface of the tire, and hence the best braking effect, is achieved even under the limiting conditions at a slip $s$ between 20 percent and 30 percent.

When choosing a control variable all known antiskid devices use an indirect indication of slip such as wheel deceleration. In such a case the optimum control is possible only under certain external conditions since the slip between the tire and the road depends on several other factors. If the antiskid device is designed so that it reacts under the most unfavorable conditions, the stopping distance under normal driving conditions is unnecessarily increased.

From the defining equation of the slip $$s = V_F - V_R / V_F$$

in which $V_F$ is the translational speed of the vehicle and $V_R$ the rotational speed of the wheel, it can be seen that the calculation of the difference between the translational speed and the rotational speed is necessary for optimum braking control depending on the slip. The difficulty has been, however, to determine the translational speed during the braking process.

It is possible to measure the speed difference by comparing voltages, proportional to the rotational speed, of generators which are driven, on the one hand, by the four braked wheels of the vehicle and, on the other hand, by a fifth unbraked wheel rotating freely. The output voltage of the generator on the unbraked wheel would correspond to the actual driving speed $V_F$. It is however evident that such a fifth wheel cannot practically be provided on a vehicle.

In aircraft and rocket constructions the speed is measured by an acceleration transmitter arranged on a stabilized platform, the acceleration being integrated over the time. These devices are, however, too intricate and too expensive for the automotive industry.

SUMMARY OF THE INVENTION

It is an object of this invention to provide a speed sensor which meets the requirements mentioned above and which is particularly suitable for antiskid systems in automotive vehicles.

According to the invention there is provided an antiskid device, particularly for automotive vehicles, in which the output signals of speed sensors associated with the individual wheels of the vehicle are compared with a reference signal in order to influence the brake pressure in dependence on a signal resulting from the comparison, wherein a first sensor is provided which has an output signal proportional to the translational speed of the vehicle, and a second sensor is provided which has an output signal proportional to the rotary speed of the wheel, and wherein these two signals are compared in an electronic circuit in order to produce a signal which is directly proportional to the slip.

A flywheel mass is rotated at an angular velocity corresponding to that of an unbraked wheel of the vehicle and means are provided to brake the freely rotating flywheel mass, after the braking process has been initiated, in dependence on the actual vehicle speed, thus providing a means for generating a signal proportional to the vehicle speed which may be compared with the signals from the rotary speed sensors of the vehicle wheels.

For measuring the translational speed, the flywheel is arranged in a housing which protects the wheel from dirt. The flywheel is connected to one vehicle wheel via a shaft and a clutch which releases the flywheel when the brake pedal is actuated. A movable inert mass in the housing acts as a brake upon the flywheel to reduce the flywheel speed in proportion to the reduction in vehicle speed.

The inert mass may be a pendulum suspended in the housing, the pendulum consisting of a pendulum weight and a friction block cooperating with a friction surface provided on the flywheel.

The rotary speed of the vehicle wheels and of the flywheel is measured by means of rotary speed sensors preferably by induction. The sensors essentially comprise an induction coil, and a cam plate of the wheel passes by this coil.

DESCRIPTION OF THE SPECIFIC EMBODIMENT

Figures 1, 2:
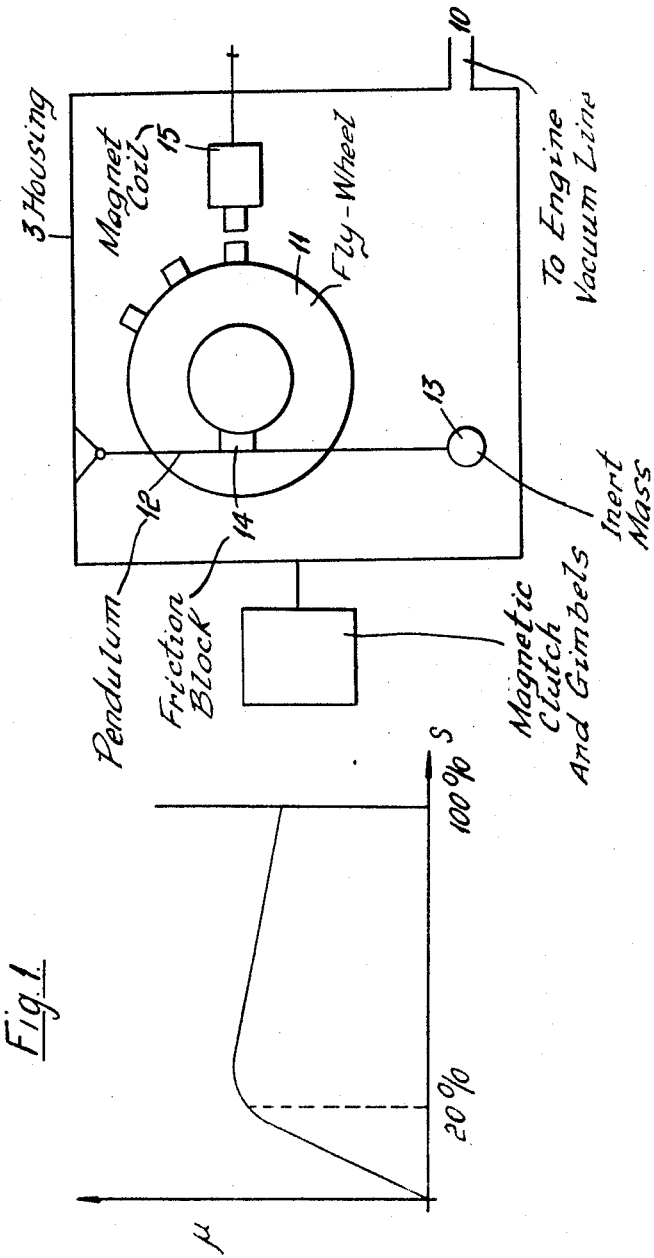
FIG. 1 shows a friction value versus slip diagram.
FIG. 2 shows, schematically, a device embodying this invention for measuring the translational speed of a vehicle.
Figure 3:
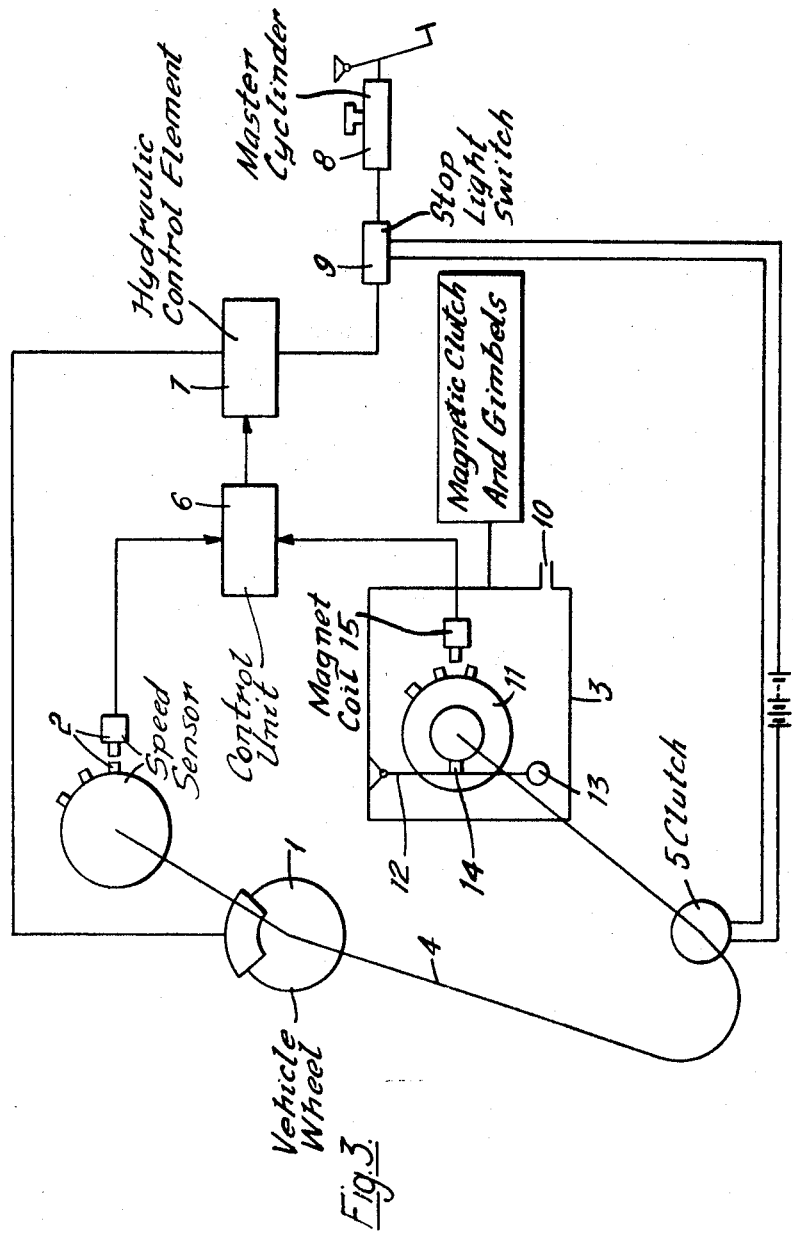
FIG. 3 shows, schematically, an automatic control system in which the measuring device of FIG. 2 is utilized.

An essentially known speed sensor 2 is arranged on the vehicle wheel 1. A toothed disc corotating with the wheel 1 induces a pulse sequence, proportional to the speed of the wheel, in a magnet coil.

Further a flexible shaft 4 goes from the wheel 1 to the clutch 5 and causes a flywheel 11 to rotate in a housing 3. A pendulum 12 having an inertia mass 13 at the end is suspended in the housing. The pendulum swings in response to speed changes of the vehicle due to the inertia of a mass 13 fixed to the pendulum, and in the particular case of a deceleration the pendulum brings a friction block 14, which is also fixed to the pendulum 12, into frictional contact with the rotating flywheel 11 and thus braking it after it has been separated from the driving shaft upon actuation of the brake pedal.

The pendulum is arranged on that side of the flywheel which is remote from the driving direction in order to obtain a contact between the friction block and the friction surface of the flywheel upon a deceleration of the vehicle.

The friction force appearing at the flywheel 11 is directly proportional to the translational deceleration of the vehicle. The flywheel 11 has teeth on its periphery which induce a pulse sequence, proportional to the rotary speed, into a magnetic coil 15. The inductive method of determining the value is preferred in this case as only slight decelerating forces are exerted on the flywheel. Since the measured values on the flywheel 11 have to be compared with those on the wheel 1, it is expedient to design the wheel sensor 2 in the same way. It is also possible to determine the measured value by an optoelectronic method.

In order to achieve a slowing down of the flywheel 11 over a longer period (when the braking process lasts longer), the housing 3 is connected to the vacuum of the engine via connection 10. The pendulum weight 13 and the contact faces of the flywheel and of the friction block 14 have to be designed and machined in such a way that the rotary speed of the flywheel mass 11 at any time equals the translational speed of the vehicle. In the control unit 6, which is connected to its power source when the brake pedal is actuated, the voltage signals of the sensors are operated upon according to FIG. 1 and compared with those of the sensors 2. There results from this a variable corresponding to the difference between the vehicle speed and the wheel speed, i.e., the slip. This variable serves as the control variable for the antiskid device.

When the control variable passes outside a predetermined range of tolerances a signal results at the output of the control unit 6. This signal is transmitted to a hydraulic control element 7 which controls the manipulated variable, i.e., the hydraulic pressure available from the master cylinder 8, and hence the slip, e.g., by changing the volume of the hydraulic brake line or by actuating inlet or outlet valves.

Since the sensor for the vehicle speed has to be installed at a place which is not endangered by road dirt, the flywheel 11 is coupled to a flexible shaft 4 which leads to one vehicle wheel. The clutch 5 is shown as a magnetic clutch whose supply is interrupted via the stoplight switch 9 when the brake pedal is actuated. Of course it is also possible to use a mechanical clutch, preferably a mechanical freewheeling clutch.

Only one sensor for the translational speed is necessary in a vehicle. The sensor is connected to one of the vehicle wheels via the magnetic clutch 5. A sensor 2, a control unit 6 and an hydraulic element 7 are provided for each wheel whose slip is to be controlled. The output voltage of the translational speed sensor has to be transmitted to each of the control units 6.

In order to ensure correct functioning of the translational speed sensor on ascending or descending roads, the whole sensor can be suspended on gimbals so that the pendulum does not leave its perpendicular position, and thus the braking effect of the friction block 14 on the flywheel 11 is reduced on an ascending road, and increased on a descending road. At the moment of braking the sensor has to be arrested via the magnetic clutch in order to prevent the whole sensor, but not the pendulum 12, from swinging upon deceleration of the vehicle.

This problem could attentively be solved by incorporating a second pendulum into the sensor which measures the inclination of the vehicle and corrects the pendulum which causes the friction on the flywheel.

I claim as my invention:

1. An antiskid device, particularly for hydraulic brake systems of automotive vehicles, comprising a first sensor coupled to one road wheel of a vehicle to provide a first output signal proportional to the translational speed of the vehicle; a second sensor coupled to at least a selected one of the road wheels of said vehicle to provide a second output signal proportional to the rotary speed of said selected one of said road wheels; and first means coupled to said first and second sensors to compare said first and second output signals to provide a third output signal directly proportional to slip; said first sensor including a flywheel and second means having a pendulum associated with said flywheel to cooperate in braking said flywheel after a braking process has been initiated in a manner dependent on the actual speed of said vehicle.

2. A device according to claim 1, wherein said first sensor further includes a housing for said flywheel and said second means and said flywheel is connected to said one road wheel by a shaft and a clutch disposed along said shaft between said flywheel and said one road wheel, said clutch being released by actuation of the brake pedal of said brake system of said vehicle.

3. A device according to claim 2, wherein said shaft is flexible.

4. A device according to claim 2, wherein there is a separate second sensor coupled to each of the road wheels of said vehicles.

5. A device according to claim 2, wherein said second means further includes a pendulum weight and a friction block connected to said pendulum, said friction block cooperating with a friction surface on said flywheel to brake said flywheel.

6. A device according to claim 5, wherein the interior of said housing is connected to said vehicle's engine vacuum line.

7. A device according to claim 5, wherein said pendulum is disposed on that side of said flywheel which is remote from the driving direction of said vehicle.

8. A device according to claim 2, wherein said housing is suspended on gimbals and upon brake actuation said housing is arrested by means of a magnetic clutch.

9. A device according to claim 2, wherein said clutch is a magnetic clutch coupled to a power supply and said actuation of said brake pedal disconnects said magnetic clutch from said power supply.

10. A device according to claim 2, wherein said clutch is a mechanical freewheeling clutch.

11. A device according to claim 1, wherein said flywheel is a first toothed disc and a first induction coil associated with said first disc provides said first output signal.

12. A device according to claim 11, wherein said second sensor includes a second toothed disc coupled to said selected one of said road wheels and a second induction coil associated with said second toothed disc provides said second output signal.

13. A device according to claim 1, further including a hydraulic control element disposed in said brake system and coupled to said first means responsive to said third output signal to control brake pressure in said brake system.

14. A device according to claim 1, wherein said second sensor includes a toothed disc coupled to said selected one of said road wheels and an induction coil associated with said toothed disc provides said second output signal.

* * * * *